9292½X
A. Wilder.
Mill Bolt.
Patented Dec. 15, 1885.
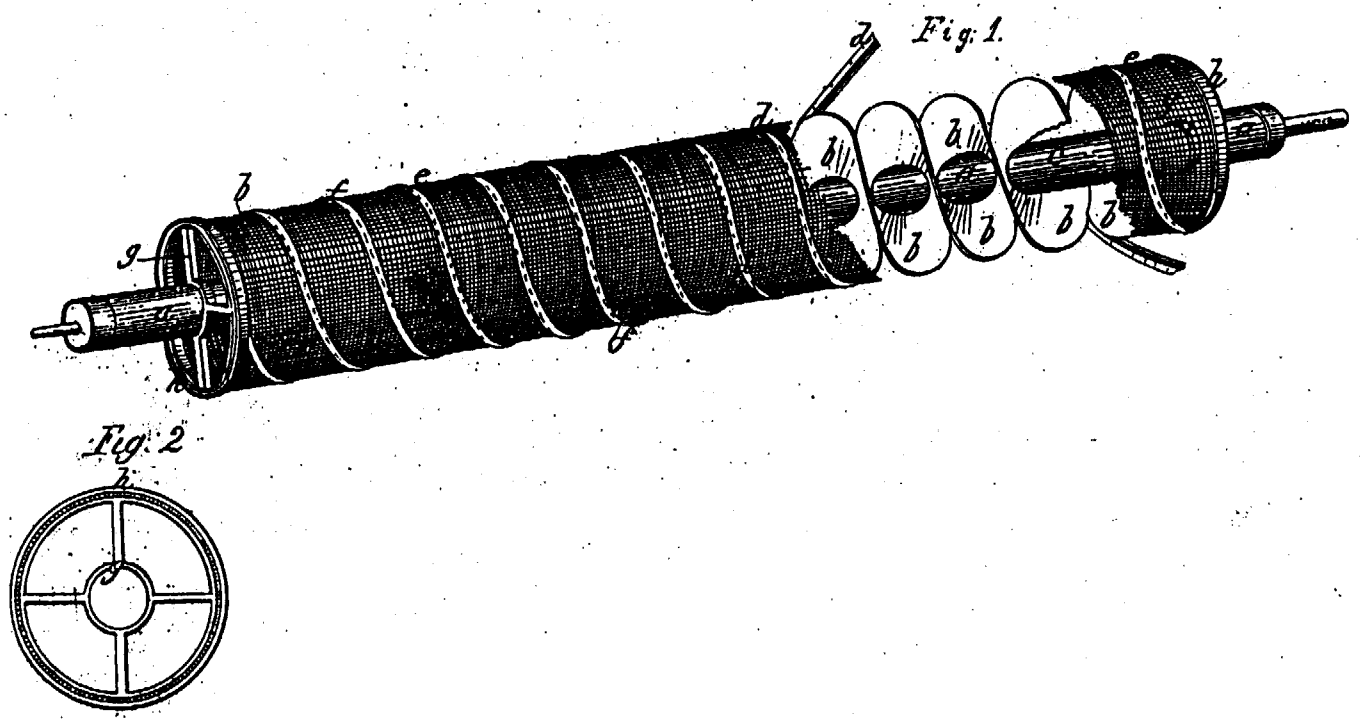

Arelius A Wilder Mount Morris New York

Letters Patent

The schedule referred to in these Letters Patent and making part of the same
containing a description in the words of the said Arelius A Wilder himself
of his improvement in the spiral bolt for bolting flour To all to whom these presents shall come. Be it known that I Arelius
A Wilder of Mount Morris in the County of Livingston and State
of New York have invented a new and useful spiral bolt for bolting
meal or flour and that the following is a full and exact description
thereof —

This bolt should generally be made from ten to fifteen feet long and
from twenty four to twenty eight inches in diameter. The shaft which passes
through the centre of this bolt should be made of pine or other light timber
and be about eight inches through. the thread which winds around
this shaft should be from eight to ten inches wide and made of some
metalic substance such as tin copper or sheet iron and run at an
angle of about ten degrees around the shaft. the foot or bottom of this
thread sets into this shaft by having a groove cut around the shaft
about a half an inch deep. there is also [illegible] or flanges cut and turned
each way on the bottom of the thread for the purpose of nailing through
into the shaft around the outer edge of the thread runs a hoop or
ribband one inch wide and three fourths of an inch thick and
made of tough hard wood with a groove in the under side to admit
the thread about one fourth of an inch this is fastened to the thread
by means of wires passing round it and through the out edge of
the thread on this ribband is placed the bolting cloth over the
whole then and following the ribband is put a narrow strip of leather
through which nails are driven which holds the bolting cloth firmly
to the ribband, the cloth is fastened at each end by means of iron
frames made in the following manner. Around the end of the shaft Drawing [illegible]

9292½X is a collar or band with four arms, screwed and on the ends of
these arms is fastened an iron hoop the same size in diameter as the
bolt; on this is drawn the ends of the bolting cloth, & fastened by
having another iron hoop made to set snugly over the hoop sup-
-ported by the arms and bolting cloth, these two hoops are ~~[illegible]~~ then
screwed together which holds the ends of the cloth firmly. The meal
or flour being admitted into the head of a fifteen feet bolt would
travel through a space of about one hundred and fifty feet before
coming out at the tail.

The advantages then which the spiral bolt posses-
-ses over any other is in containing the meal longer in the bolt and
carrying it thro' a much greater space — the small quantity of
meal also that is admitted between the intermediate threads is
carried separately through from the head to the tail of the bolt.
consequently it bolts it much more effectually.

What I claim as my own invention
and not previously known in the above described machine is
the frame or reel around which the bolting Cloth is put
and the fastenings at the ends

Andrew A. Wilder

Witnesses
Joseph Potter
John Wilder Jr

611 [illegible]